US006188936B1

(12) United States Patent
Maguire et al.

(10) Patent No.: US 6,188,936 B1
(45) Date of Patent: Feb. 13, 2001

(54) GRAVIMETRIC BLENDER WITH OPERATIVELY COUPLED BAR CODE READER

(76) Inventors: Stephen B. Maguire, 1549 E. Street Rd., Glen Mills, PA (US) 19432; Paul S. Maguire, 361 Glen Mills Rd., Thornton, PA (US) 19373

(*) Notice: Under 35 U.S.C. 154(b), the term of this patent shall be extended for 0 days.

(21) Appl. No.: 09/079,244

(22) Filed: May 14, 1998

Related U.S. Application Data (63) Continuation-in-part of application No. 08/989,352, filed on Dec. 12, 1997, and a continuation-in-part of application No. 08/763,053, filed on Dec. 10, 1996, now Pat. No. 6,007,236.

(60) Provisional application No. 60/046,573, filed on May 15, 1997, provisional application No. 60/008,498, filed on Dec. 11, 1997, and provisional application No. 60/016,064, filed on Apr. 23, 1996.

(51) Int. Cl.[7] .......................... G05B 21/00; G05B 19/18; G06F 7/00

(52) U.S. Cl. .............................. 700/265; 700/52; 700/65; 700/164; 700/266; 700/215; 700/217; 222/57; 222/58; 222/75; 222/77; 366/18; 366/20; 366/21; 366/141

(58) Field of Search ................................ 700/52, 65, 66, 700/163, 165, 166, 265, 266, 213–220; 222/57, 56, 75, 77; 366/18, 20, 21, 141

(56) References Cited

U.S. PATENT DOCUMENTS

| 2,161,190 | 6/1939 | Paull . |
| 3,111,115 | 11/1963 | Best .................................. 700/213 |

(List continued on next page.)

FOREIGN PATENT DOCUMENTS

| 3541532A1 | 11/1985 | (DE) . |
| 3923241 | 1/1991 | (DE) . |
| 4323295 | 2/1995 | (DE) . |
| 0318170 | 5/1989 | (EP) . |
| 0507689 | 10/1992 | (EP) . |
| 0587085 | 3/1994 | (EP) . |
| 0743149 | 11/1996 | (EP) . |
| 2517087 | 9/1982 | (FR) . |
| 2081687 | 2/1982 | (GB) . |

OTHER PUBLICATIONS

Sheet of 2 photographs of Mould–Tek gravimetric blender, circa 1993.
Sheet of 2 photographs of Motan gravimetric blender and feeding system with Maguire Products, Inc. controls, circa 1993.
Sheet of 3 photographs of UNA–DYN gravimetric blender, circa 1993.

(List continued on next page.)

Primary Examiner—Paul P. Gordon
Assistant Examiner—Ramesh Patel
(74) Attorney, Agent, or Firm—Charles N. Quinn; Saul Ewing LLP (57) ABSTRACT

A method for weight blending of granular materials comprises at a remote site generating a command for desired operation of granular material weight blending apparatus; encoding said command into transportable time-stable machine readable tangible storage media; transporting said media to a bar code reader operatively connected to said granular material weight blending apparatus; scanning the tangible media having the command encoded thereon to read the command; and providing the read command as input to a in microprocessor operatively connected to said granular material weight blending apparatus for regulating operation of the same.

13 Claims, 3 Drawing Sheets

U.S. PATENT DOCUMENTS

| | | | |
|---|---|---|---|
| 3,115,276 | 12/1963 | Johanningmeier | 700/213 |
| 3,209,898 | 10/1965 | Beebe et al. | 700/213 |
| 3,348,848 | 10/1967 | Lucking et al. | 277/26 |
| 3,470,994 | 10/1969 | Schell et al. | 198/1 |
| 3,959,636 | 5/1976 | Johnson et al. | 235/151.33 |
| 3,985,262 | 10/1976 | Nauta | 220/369 |
| 4,026,442 | 5/1977 | Orton | 222/181.3 |
| 4,108,334 | 8/1978 | Moller | 222/136 |
| 4,148,100 | 4/1979 | Moller | 366/156.1 |
| 4,219,136 | 8/1980 | Williams et al. | 222/450 |
| 4,354,622 | 10/1982 | Wood . | |
| 4,402,436 | 9/1983 | Hellgren | 222/561 |
| 4,454,943 | 6/1984 | Moller | 198/657 |
| 4,475,672 | 10/1984 | Whitehead | 222/561 |
| 4,498,783 | 2/1985 | Rudolph | 366/132 |
| 4,525,071 | 6/1985 | Horowitz et al. | 368/152 |
| 4,581,704 | 4/1986 | Mitsukawa | 700/164 |
| 4,705,083 | 11/1987 | Rossetti | 141/104 |
| 4,756,348 | 7/1988 | Moller | 141/83 |
| 4,793,711 | 12/1988 | Ohlson | 366/18 |
| 4,830,508 | 5/1989 | Higuchi et al. | 366/141 |
| 4,848,534 | 7/1989 | Sandwall | 198/535 |
| 4,850,703 | 7/1989 | Hanaoka et al. | 366/160 |
| 5,110,521 | 5/1992 | Moller | 264/404 |
| 5,116,547 | 5/1992 | Tsukahara et al. | 264/1.1 |
| 5,132,897 | 7/1992 | Allenberg . | |
| 5,143,166 | 9/1992 | Hough . | |
| 5,148,943 * | 9/1992 | Moller | 222/1 |
| 5,172,489 | 12/1992 | Moller | 34/472 |
| 5,225,210 | 7/1993 | Shimoda | 425/145 |
| 5,243,455 * | 9/1993 | Ricciardi et al. | 222/1 |
| 5,252,008 | 10/1993 | May, III et al. . | |
| 5,261,743 | 11/1993 | Moller | 366/196 |
| 5,285,930 | 2/1994 | Nielsen . | |
| 5,340,949 | 8/1994 | Fujimura et al. . | |
| 5,341,961 | 8/1994 | Hausam . | |
| 5,423,455 | 6/1995 | Ricciardi et al. | 222/1 |
| 5,651,401 | 7/1997 | Cados . | |
| 5,767,453 | 6/1998 | Wakou et al. . | |
| 5,767,455 | 6/1998 | Mosher . | |
| 5,780,779 | 7/1998 | Kitamura et al. . | |
| 5,843,513 | 12/1988 | Wilke et al. . | |
| 5,896,297 * | 4/1999 | Valerino, Sr. | 700/228 |
| 6,007,236 * | 12/1999 | Maguire | 366/141 |

OTHER PUBLICATIONS

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisment entitled "A Full Line–up of Blender Solutions . . . Priced Right!" by HydReclaim, circa 1993.

Advertisement entitled "New From HydReclaim—Now Processors Can Economically Active Continuous Gravimetric Blending" by HydReclaim, circa 1993.

Article entitled "Control Loading Systems" from Plastics Technology, Oct. 1995, p. 41.

Advertisement "Introduction our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two–sided flyer entitled "GB 140 Series Compact Auto Weigh Blender" published by Conair Franklin in the United States, Jun. 1994.

Six page brochure entitled "Graviblend Precise Continuous Weigh Blenders" published by Ktron Vertech, Jun., 1991, United States.

Six page brochure entitled "Piovan Gravimetric Blenders MDW" published by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled Plastic Molders and Extruders: "published by Maguire Products, Inc., 1995".

* cited by examiner

FIG. 3

GRAVIMETRIC BLENDER WITH OPERATIVELY COUPLED BAR CODE READER

CROSS-REFERENCE TO RELATED PATENT APPLICATIONS

This patent application is based in part on and claims the benefit, under 35 USC 120, of the filing date of provisional U.S. patent application Ser. No. 60/046,573 filed May 15, 1997 in the names of Stephen B. Maguire and Paul S. Maguire and entitled "Gravimetric Blender with Operatively Coupled Bar Code Reader".

This patent application is also a continuation-in-part of pending U.S. patent application Ser. No. 08/989,352 filed Dec. 12, 1997 in the name of Stephen B. Maguire and entitled "Reduced Size Gravimetric Blender" and U.S. patent application Ser. No. 08/763,053 now U.S. Pat. No. 6,007,236 filed Dec. 10, 1996 in the name of Stephen B. Maguire and entitled "Weigh Scale Blender", the benefit of the effective filing dates for both of which are claimed under 35 USC 120.

U.S. patent application Ser. No. 08/989,352 is in turn based on and claims, under 35 USC 120, the benefit of the effective filing dates of provisional U.S. patent application 60/045,434 (for which a petition for conversion to a design application was timely filed) filed May 2, 1997 and U.S. design patent application 29/071,503 now U.S. Pat. No. D424587 filed May 30, 1997.

U.S. patent application Ser. No. 08/763,053 now U.S. Pat. No. 6,007,236 is in turn based on and claims, under 35 USC 120, the benefit of the effective filing dates of provisional U.S. patent application 60/008,498 filed Dec. 11, 1997 and provisional U.S. patent application 60/016,064 filed Apr. 23, 1996.

BACKGROUND OF THE INVENTION

This invention relates generally to automated management, control and optimization of methods and apparatus for providing or otherwise processing precisely measured amounts of granular materials and, optionally, precisely measured amounts of coloring agent(s), particularly pigment in liquid form, preparatory to further processing of the combined granular materials and, optionally, liquid coloring agent(s). The invention relates more specifically to automated management, control and optimization of gravimetric blenders, optionally in combination with color addition pumps, providing precisely measured amounts of plastic resin material, and, optionally liquid coloring agents, and mixing these components prior to supplying the blended mixture to plastics manufacturing and processing equipment such as plastic injection molding, compression molding and extrusion equipment.

FIELD OF THE INVENTION AND DESCRIPTION OF THE PRIOR ART

The modern gravimetric blender was essentially originated by one of the applicants of this invention and is widely used throughout the world by industries concerned with precision feeding of granular material, especially plastic resin material.

Gravimetric blenders operate by blending solid plastic resin material components and additives, by weight, in batches. Typically batches of material may consist of several solid material components. One of these may be "regrind", consisting of ground plastic resin which had previously been molded or extruded and which either resulted in a defective product or was excess material not formed into a desired product.

Another component may be "natural" plastic resin which is virgin in nature in the sense that it has not previously been processed into a molded or extruded plastic part.

Yet another component may be a solid color material, typically flakes or freeze dried material, used to produce a desired color of the finished plastic part.

Still yet another component may be an additive used to adjust the blend to provide required performance characteristics during molding, extrusion or subsequent processing.

The gravimetric blender as originated by one of the applicants and as copied widely throughout the world typically includes hoppers for each of the components of the solid material to be blended together. Typically several hoppers or several compartments in a hopper may be provided, such as one compartment for "regrind" material, one compartment for "natural" material, one component for solid color additive material and one compartment for "additive".

When the gravimetric blender operates, the unit desirably operates automatically, adding each of the component solid materials in the proper, desired percentages. Each solid material component is dispensed by weight into a single weigh bin. Once the proper amounts of each component have been serially dispensed into the weigh bin, all of the components are dropped together into a mixing chamber from the weigh bin.

Mixing is performed preferably continuously, and preferably even as additional batches of components are dispensed into the mixing chamber. When mixing is complete, the resulting blend is preferably provided directly to the desired molding or extrusion machine.

It is known to provide feedback control of the dispensed amounts of each solid material component provided to the weigh bin and measured by weight so that in the event of an error in the amount of a dispensed component, the succeeding batch may have the blend adjusted to account for the error detected in the preceding batch of blended material.

As one of the components forming a part of the resulting blend, it is known to supply solid color additives to the blend in order to provide a blend of a desired color. These color additives may be flaked pigments on wax carriers or in freeze dried form. It is also known to provide the color as pigment powder constituting one component of the resulting blend.

When preparing blends of resinous plastic material for molding or extrusion, when color amounts are too low the error is visible and a correction to increase color may be effectuated by an operator. However, when color amounts are too high, the problem is not visible and operators manually operating the process normally do not make any adjustment in the amount of color. Hence adjustments are frequently made to increase the amount of color materials supplied to a blend but almost never is the amount of color supplied to the blend reduced.

Liquid color material cannot be pre-blended into one of the solid material components and stored because of the danger inherent and difficulties attendant to clean-up in the event of component failure. Hence, liquid color, when used in plastics material processing heretofore, has been metered directly into the throat of a molding press or an extrusion machine, at a position to join the solid resinous material blend just prior to the molding or extrusion operation. This approach creates difficulties, among them being compensating for addition of pre-colored regrind solid material to the material mix.

When regrind is added to the blend of plastic resin materials, the regrind already contains the necessary color; such regrind need not be colored a second time. When metering resinous material at the throat of a molding press or an extrusion machine, such metering is conventionally performed volumetrically. Hence, the presence of already colored regrind, not requiring additional coloration, cannot be detected. As a result, excess liquid color is typically added to the blend, sometimes producing an unacceptable product and always resulting in the use of unneeded color material, which is undesirable and results in unnecessary expense.

Gravimetric blenders typically use one or more load cells to detect the weight of the weigh bin and material contained therein. Vibrational and shock loading of the load cells may result in erroneous measurements of the weight of the weigh bin and the material contained therein. These erroneous measurements may result in addition of excess material or an insufficient amount of a material component in a subsequent batch thereby producing a batch of blended material deviating from the desired specifications. The load cells are subject to some vibration and shock loading due to the presence of pneumatic piston-cylinder combinations typically connected to the frame of the gravimetric blender and used to dispense solid granular resinous material from a hopper downwardly into the weigh bin.

Further, vibrational and shock loading of the load cells may result from use of typically pneumatically driven piston-cylinder combinations to empty the weigh bin when the weight measurement is complete. Yet further vibrational and shock loading of the load cells may result from operation of the mixing chamber and the motor driving mixing means within the mixing chamber.

Because the frame of the gravimetric blender must be a rigid, high strength structure to provide the required strength to support the material storage hoppers and other components of the gravimetric blender, the gravimetric blender frame is typically steel. Since the frame is steel and rigid, shock and vibrational loads applied to the frame are readily transmitted along the frame and received by the various components of the gravimetric blender connected to the gravimetric blender frame.

When the gravimetric blender is mounted directly on a plastics material processing machine such as an extruder or, more particularly, an injection molding machine, the load cells of the gravimetric blender can be subjected to very substantial shock and vibrational loading. Injection molding machines have heavy steel platens and molds which open and close as parts are molded and ejected. There is a considerable amount of movement in an injection molding machine and the parts which move are heavy. Hence shock loads, which continuously propagate throughout injection molding machines and hence propagate through the gravimetric blender when the blender frame is bolted to the injection molding machine, may be quite substantial.

In gravimetric blenders utilizing single load cells, loads on a cell may be substantial. In single load cell is gravimetric blenders the single load cell typically has the weight of the weigh bin cantilevered on an arm and the cell bears the entire weight of the weigh bin and the material contained therein. Hence vibrational loading of the frame of the gravimetric blender may produce substantial vibrational loading of the load cell with stress to the load cell due to the weight carried by the load cell. Cantilevering the weigh bin from the load cell results in high moments of inertia being applied to the load cell when the load cell is subject to vibration and shock loading.

One disadvantage attendant to gravimetric blenders is that while these blenders are operated and controlled by microprocessors, data is input into the microprocessor manually. It has not heretofore been known to provide such data in a dynamic, ongoing, continuous manner, whether such data be set-up data for the gravimetric blender, namely weight and recipe of granular material to be dispensed by the gravimetric blender, or other inventory and management control type of data such as the identification of the operator on whose shift the gravimetric blender is operating, the identification of the manufacturer of the resin being blended, etc.

Additionally, it has not been known heretofore to provide commands from a remote locale to a microprocessor controlling one of more gravimetric blenders on a dynamic basis for alteration of the operational profile of the microprocessor and hence the gravimetric blender.

SUMMARY OF THE INVENTION

In one of its aspects this invention provides a gravimetric blender command and/or data reader combination where the gravimetric blender preferably includes a frame, a hopper supported on the frame, a weigh bin below the hopper and load sensing means mounted on the frame for sensing weight of the bin including material contained within the bin.

The gravimetric blender further preferably includes pneumatic piston-actuated means, preferably connected with the hopper, for releasing material within the hopper towards the weigh bin. A mix chamber preferably below the bin preferably includes mixing means therewithin.

In another of its aspects, this invention provides a method for remote control of granular material processing apparatus including the steps of generating at a remote site of one or more commands for desired operation of granular material processing apparatus, encoding the command(s) into transportable time-stable machine-readable tangible storage media, transporting the media to a compatible command reader operatively connected to the granular material processing apparatus, scanning the tangible media having the command(s) encoded thereon to read the command(s) and providing the command(s) as input to a microprocessor operatively connected with the granular material processing apparatus for regulating operation of the same.

Optionally, the commands may be encoded into the storage media as optically-readable bar codes.

Further optionally, the storage media may include magnetic strips and/or digitally encodable chips and/or optically readable strips.

Preferably, the commands have multiple fields.

Optionally, the commands may include blender and/or component-specific identifiers.

The gravimetric blender preferably further includes pneumatically actuated means for releasing material within the bin into the mix chamber. A motor preferably rotates the mixing means.

Optionally, a color addition pump may be provided with the gravimetric blender.

Respecting the combination of the gravimetric blender, the optional color addition pump means for supplying liquid color to the material mix for blending therewith, and the command and/or data reader, the pump means supplying liquid color may desirably be a peristaltic pump or a progressive cavity pump. The liquid color is supplied by such a liquid pump in an amount measured by weight in the blender, in the same manner as the other, solid material components of the resulting material blend are added. Peristaltic pumps are preferred.

Gravimetric blending using a gravimetric blender of the type to which this invention relates permits detection of the presence of colored solid regrind material and resultant adjustment of the amount of liquid color being added. This invention, in one of its aspects combining a liquid color supply pump, a gravimetric blender and a command and/or data code reader results in addition of liquid color to the material blend in a heretofore unknown, controlled and optimized manner, providing many of the same advantages as when blending just dry plastic powder and concentrated plastic resin pellets.

When these granular solid and liquid materials are added to the gravimetric blender there is precise metering, no over-coloring and no danger of recoloring regrind material.

In yet another one of its aspects this invention provides the combination of a two dimensional bar code, magnetic character or optical character reader for reading microprocessor commands and/or data such as operator badge number, work order number, hopper number, conveyor number, recipe data and the like and providing the same to a microprocessor controlling one or more gravimetric blenders or, optionally, to a personal computer operatively connected to one or more gravimetric blenders to control operation of the blender.

Desirably, the command and/or data reader provides one or more lines of information directly into a memory component of a gravimetric blender controller or microprocessor. This permits set-up information for operation of the gravimetric blender to be entered easily and accurately, either by the operator manually entering such information into the gravimetric blender microprocessor, or automatically with the information being scanned by the reader from a label or a container located on a moving conveyor belt or elsewhere. This also permits operation of the blender to be changed dynamically by providing new and updated commands to the microprocessor controlling operation of the blender. Such supplying of commands on a dynamic basis reduces the usage of microprocessor memory thereby providing additional memory for storage of data, permitting more sophisticated algorithms to be executed and the like.

In still another one of its aspects, the invention includes supplying the desired weight and recipe of granular material to be dispensed by the gravimetric blender. In this regard rotational molders require precisely dispensed amounts of material based on the weight of the part to be molded. Also, such molders require a variety of colors. Various weights of material in various colors are molded at the same time requiring that an operator pre-measure containers of raw material in the correct weight and color. A gravimetric blender may perform this operation if the blender is provided with proper set-up or initialization information.

In still yet another one of the aspects of this invention, by providing the set-up information in a bar code or other machine readable media on a container or elsewhere and placing the container or other bar code labels or other machine readable media on a conveyor, the compatible reader can read those data and supply the information to the gravimetric blender thereby permitting the gravimetric blender to automatically fill the containers with the requested blend of plastic resin material at the required weight for proper and accurate manufacture of the plastic part of interest.

In still another of its aspects, this invention embraces providing color material containers with machine-readable information encoded as a bar code or in magnetic or other operatively readable form, desirably on labels applied to the containers. Operators of gravimetric blenders can then scan the information media available with the color containers prior to the start of production of blended material to confirm that the operator is using the correct, desired color material. Numbers encoded in the media match the blend recipe that has been loaded into the microprocessor controlling operation of the gravimetric blender. In this manner the physical blend components being blended by the gravimetric blender are confirmed to match the components desired theoretically for operation of the molding or extruding machine of interest.

In yet still another of its aspects this invention embraces providing a bar code or other machine readable encoded information on the mold in which a molded plastic part is to be formed. Alternatively, the bar code or other machine readable encoded information may be placed on a sample part which is representative of the parts to be formed. In either case providing the bar code or other machine readable encoded information in these positions and then having the bar code or other encoded machine readable information read by the compatible reader connected to the gravimetric blender, so that the correct data is supplied to the microprocessor controlling the gravimetric blender, insures that the correct material recipe is entered prior to the start of production and output of material from the gravimetric blender.

In yet another of its aspects this invention embraces providing an operator number on an identification card to be scanned by the reader at the time the shift changes, to track operators who are controlling various gravimetric blenders and molding machines in a molding facility.

In yet another of its aspects this invention embraces reading work order numbers as bar codes or other machine readable information with a compatible reader and providing such work order numbers into the microprocessor controller of the gravimetric blender prior to production of a given lot of production parts.

In yet another aspect, this invention embraces providing material lot numbers as bar codes or other machine readable information to be scanned by the compatible reader at the time of use and production to insure backward traceability and accountability in the event of a product failure in the future, after the product has been molded. Specifically, this permits determination of the specific lots of raw or virgin and regrind granular material which were supplied to the molding machine to make the part which subsequently failed.

In yet another of its aspects this invention embraces regulating maximum allowable amounts of reprocessed material to insure a level of quality or minimum usage of reprocessed material equal to advertised claims respecting recycling. Additionally, legal requirements often specify a maximum allowable use of reprocessed material to ensure high quality levels.

In one of its aspects this invention embraces using the compatible reader to read a given part number, recipe and the like as a bar code or other encoded information to insure proper recipe entry and proper percentage of materials being used by the gravimetric blender producing the blend of materials supplied to the molding machine, all in conformity with the applicable laws and in support of advertised claims respecting recycling.

In another of its aspects, this invention embraces a method for controlling a granular material processing system including the steps of at a remote site generating commands having equipment-specific identifiers encoded therein for desired operation of selected equipment of the granular material processing system, encoding the commands into transportable time-stable machine-readable tangible storage media, transporting the media to compatible command reading means operatively connected to selected equipment of the granular material of the processing system, scanning the tangible media having the commands encoded therein to read the commands and providing the read commands as input to at least one microprocessor operatively connected to selected equipment of the granular material processing system for regulating operation of the selected equipment according to microprocessor recognition of the equipment-specific identifier encrypted into the commands.

DESCRIPTION OF THE PREFERRED EMBODIMENT AND BEST MODE KNOWN FOR PRACTICING THE INVENTION

Figure 1:
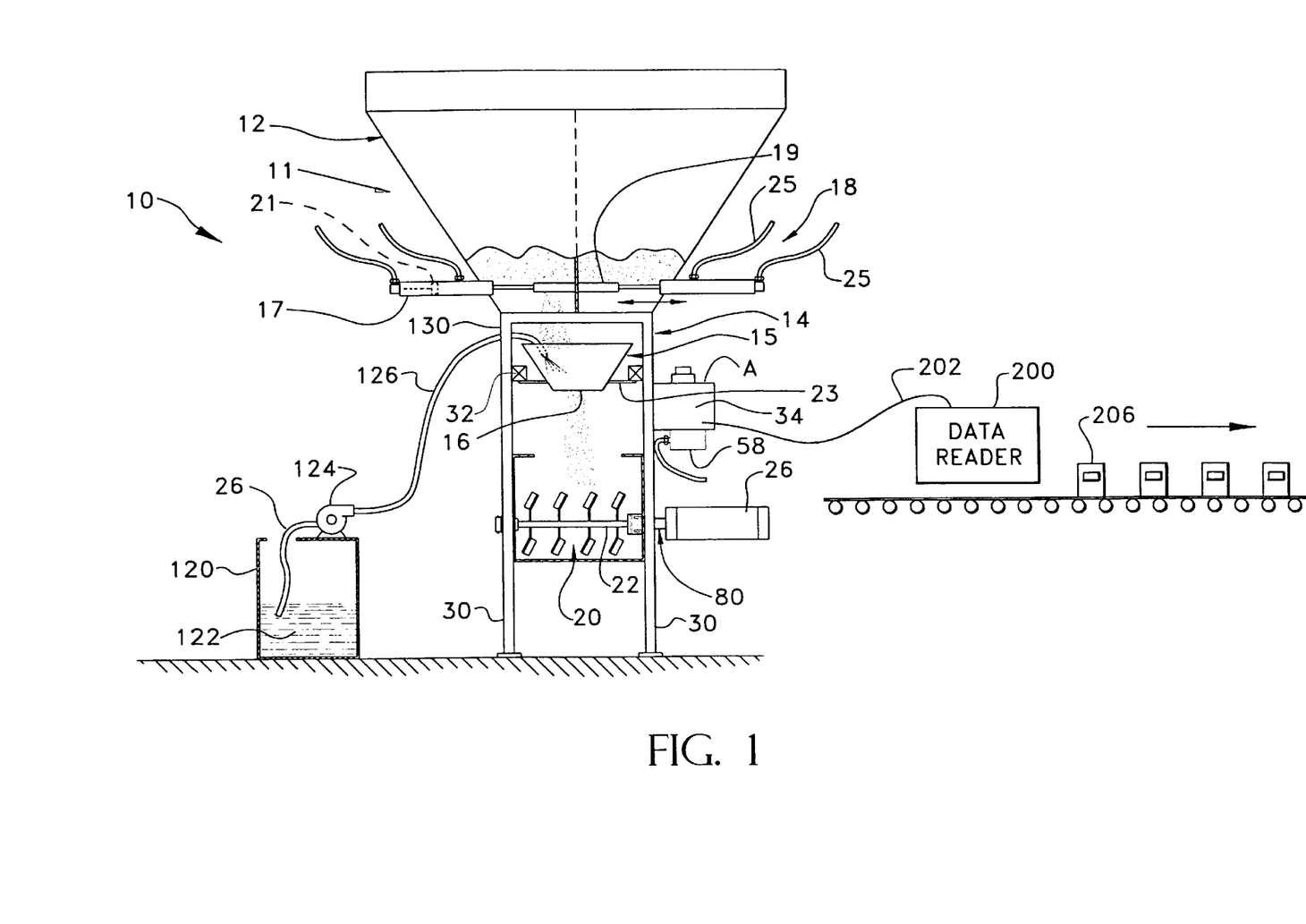
FIG. 1 is a schematic side elevation of the gravimetric blender/optional liquid color pump/optical or magnetic character or bar code reader combination with a conveyor line depicted schematically in position for reading, by the bar code reader or optical or magnetic reader recognizer, of encoded information on items carried on the conveyor line.

Referring to the drawings and to FIG. 1 in particular, a gravimetric blender together with an optional color addition pump and an optical or magnetic reader or bar code command and/or data reader combination is illustrated with this combination being indicated generally 10.

In the context of this invention, it is to be understood that reference to optical or magnetic "character" readers is not to be construed as being limited readers which recognize alphanumeric character data to the exclusion of readers which recognize binary characters. Both binary and alphanumeric character command and/or data readers are encompassed within the term "character reader" as used herein.

The gravimetric blender is designated generally 11 and includes a hopper, designated generally 12, supported by a frame designated generally 14 which holds a weigh bin 15 into which portions of plastic resin material, and optionally liquid color material, can be metered and weighed prior to release into a mix chamber 20 as described below. Frame 14 preferably includes upstanding members, which are preferably steel, such as the two upstanding members 30 illustrated in FIG. 1. Frame 14 preferably further includes connectors (not shown) for connecting upstanding members 30 together to provide rigidity for frame 14.

Hopper 12 preferably has multiple internal compartments so that a plurality of different solid resinous materials may be dispensed from hopper 12 into weigh bin 15 preferably by suitable slide gates, designated generally 19, or, alternatively, by dump flaps, located at the bottom of respective compartments of hopper 12.

Gravimetric blender 11 may further include pneumatically actuated piston means 21, housed within cylinders 17, which are operatively connected with respective slide gates 19. Piston means 21 operate in response to signals to move slide gates 19 thereby to control release of material stored within hopper 12 downwardly towards weigh bin 15. The pneumatic piston-cylinder actuated slide gate combinations are designated generally 18 in FIG. 1.

When reference is made to slide gates 19, these could alternatively be dump flaps of the type used on certain blenders manufactured and sold by the Maguire Products, Inc. in Aston, Pa., United States of America.

Alternatively, one or more auger feeders may be used in lieu of a portion of hopper 12 to control delivery of material to the weigh bin. Auger feeders are desirably used for components which are added at low proportions, such as 5% or less by weight to the mix blend. Because use of auger feeders increases the cycle time for each batch and reduces overall throughput rates, auger feeders are desirably optionally used only for addition of low weight percentage components to the blend to be mixed.

Positioned within and preferably slidably retained in place by frame 14 below weigh bin 15 is a mix chamber 20 having mixing means, which is preferably in the form of a mixing agitator 22, rotatably disposed therewithin. Agitator 22 is mounted for rotation about an axis 24 preferably shared with a drive motor 26. Motor 26 preferably has its drive shaft positioned to drive mixing agitator 22 about a common axis. Drive motor 26 is preferably supported by a cantilevered support, which has not been illustrated in the drawing for clarity, extending laterally from an upstanding member 30 of frame 14.

While the gravimetric blender illustrated in FIG. 1 has been depicted showing a single rotatable mixing agitator 22, two mixers, one desirably located above the other, may also be used for high volume applications. Mix chamber 20 is preferably fabricated to be slidably removable from frame 14 with mix chamber 20 being movable in a direction parallel with the axis of agitator 22.

Desirably located proximate to gravimetric blender 11 as illustrated in FIG. 1 is an optional liquid color reservoir 120 having liquid color therein denoted 122. A pump 124 is desirably a peristaltic pump or perhaps a progressive pump or a piston pump and connects to liquid color reservoir 120 to draw liquid color 122 from reservoir 120 by a pump color feed line 126. Pump 124 preferably provides liquid color to gravimetric blender 11 via mixer color feed line 128. This line connects to frame 14 of gravimetric blender 11 via tube holding fitment 130 through which liquid color material 122 is introduced to the upper portion of weigh bin 15 of gravimetric blender 11.

Pump 124 is desirably mounted at least close to, and preferably on, optional liquid color reservoir 120, as illustrated in FIG. 1. Such location and mounting of pump 124 close to and desirably on top of reservoir 120 is necessitated by the nature of the liquid color 122 in reservoir 120.

Liquid color 122 is typically extremely thick and viscous. Liquid color material 122 can be pumped using positive pressure a much longer distance than the liquid color material 122 can be drawn by suction or vacuum. Positive pumping using pump 124 may produce pressures of up to 100 pounds per square inch. (Suction, even if a full vacuum is achieved, relies on air pressure to move liquid and hence the maximum possible suction pressure is about 14.7 psi.) Accordingly, it is important to locate pump 124 close to reservoir 120 in order that most efficient delivery of liquid color 122 to gravimetric blender 11 may be effectuated. Suitable pumps for use as liquid color pump 124 are available from Maguire Products, Inc. in Aston, Pa.

Weight of material in weigh bin 15 is preferably sensed by load cells 32 which are preferably connected to microprocessor control means 34 which regulates operation of the gravimetric blender 11 through electrical connection with the load cells, the solenoid actuators for the solenoid valves, the motor, the liquid color pump and the like.

The microprocessor provides control of gravimetric blender 11 by monitoring, preferably on a continuous basis, weight of material, if any, at a weigh station defined by weigh bin 15 and load cells 32. By sensing weight of weigh bin 15 and opening appropriate slide gates 19, microprocessor control means 34 serially meters respective components of solid granular resinous material to the weigh station defined by weigh bin 15 until a pre-selected weight of each of the respective components has been deposited into the weigh station.

Microprocessor 34, through monitoring weight of the weigh bin and material therewithin, optionally controls metering of liquid color to the weighing station defined by weigh bin 15 and adds the metered liquid color to the respective components of solid granular material at the weigh station until a pre-selected weight of liquid color has arrived at the weigh station and has been added to the batch of solid material defined by the collective components in weigh bin 15.

Still referring to FIG. 1, a command and data reader designated generally 200 is connected by a line 202 to microprocessor 34 in order for command and data reader 200 to provide command and/or data input directly to microprocessor 34. Command and data reader 200 may be a bar code reader, a magnetic reader or another optical reader. Command and data reader 200 is located proximate to a conveyor belt designated generally 204 on which a plurality of containers 206 are illustrated schematically as moving in the direction of travel as indicated by arrow 210. Containers 206 have labels designated 208 thereon with labels 208 including encoded information in the form of optically readable bar codes, magnetically detectable magnetization locations, or other optically readable indicia all defining commands and/or data to be processed by microprocessor 34. In the preferred embodiment of the invention, the command and data reader 200 is preferably a Scanteam 3400 PDF manufactured by Welch Allyn, 4619 Jordan Road, Skaneateles Falls, N.Y. 13153, United States of America.

Suitable software for creating and printing bar codes, readable by the Scanteam 3400 PDF bar code reader is available from T.A.L. Technologies, 2027 Wallace Street, Philadelphia, Pa., United States of America under the name B-Coder for Windows. This program allows the user to select an appropriate ASCII numerical value according to firmware already programmed into the microprocessor and converts the ACSII numerical value into the bar code message field of the program.

The preferable two-dimensional bar code reader 200 is provided in combination with gravimetric blender 11, with command and data reader 200 being operatively coupled to gravimetric blender 11. Command and data reader 200 reads commands and/or data parameters including operator badge number, work order number, hopper number, conveyor number and/or scans recipe settings, with all of such information being provided to microprocessor 34 (or to a personal computer regulating operation of gravimetric blender 11) which utilizes commands and/or data parameters received from command and data reader 200 in order to regulate and optimize operation of gravimetric blender 11.

Command and data reader 200 provides a line or lines of information directly into the memory of microprocessor 34 regulating operation of gravimetric blender 11. This allows set-up information for gravimetric blender 11 to be entered easily and accurately either manually by the operator or in a more automatic mode such as by being scanned by command and data reader 200 from a label on container 206 on moving conveyor belt 204.

In one application facilitated by gravimetric blender 11 having command and data reader 200 operatively connected thereto, the information read by command and data reader 200 includes the weight of material and the recipe of such material to be dispensed by gravimetric blender 11. In this regard, rotational molders require exact amounts of material dispensed where the amount to be dispensed is based on the weight of the part to be manufactured. Additionally, such molders may mold parts of various weights and may mold parts in various colors, sometimes simultaneously.

Prior practice requires that an operator pre-measure containers of raw material in the correct amount of weight and of the correct color in order that molding of such parts of various sizes and therefore various weights and parts of various colors may proceed simultaneously. Gravimetric blender 11 having command and data reader 200 operatively connected thereto permits microprocessor 34 of blender 11 to perform this task, to provide set-up information for gravimetric blender 11 automatically, without human intervention. This set-up information appears on the bar code on a container 206 of the plastic resin material of interest. Containers 206 are placed on conveyor 204 where gravimetric blender 11, having command and data reader 200 coupled thereto, reads the bar codes or other encoded commands and/or data and then automatically fills containers 206 with the requested blend of material in the correct weight and with the correct color.

In another application facilitated by gravimetric blender 11 having command and data reader 200 operatively connected thereto, containers 206 are color containers with a bar code. Operators scan the bar codes using command and data reader 200 operatively connected to gravimetric blender 11 prior to the start of production to confirm that the correct color(s) is/are being utilized in the material being molded. Numbers on labels 208 appearing on containers 206 must match the blend recipe previously provided to microprocessor 34 controlling gravimetric blender 11. In such manner microprocessor 34 governing operation of gravimetric blender 11 confirms that the physical components of the blend match the theoretically desired components of the blend.

In another application a bar code on other data appearing on a mold in which plastic parts are molded or appearing on a sample part provides information which microprocessor 34 controlling operation of gravimetric blender 11 uses to assure that the correct material recipe is provided to blender 11 prior to the start of the molding operation of interest.

In yet another application facilitated by gravimetric blender 11 having command and data reader 200 operatively connected thereto an operator number encoded on an identification card is scanned at the time of shift change, thereby permitting management of the plant to track activity of operating personnel.

In yet another application facilitated by gravimetric blender 11 having command and data reader 200 operatively connected thereto a work order number is read by command and data reader 200 and provided to microprocessor 34 controlling and governing operation of gravimetric blender 11 prior to commencement of production of work on that particular work order.

In yet another application facilitated by gravimetric blender 11 having command and data reader 200 operatively connected thereto material lot numbers are scanned by command and data reader 200 and input to microprocessor 34 controlling operation of gravimetric blender 11 at the time of production to insure backward traceability and accountability with respect to material used to manufacture a given part in the event of a product failure in the future.

Another application facilitated by gravimetric blender 11 having command and data reader 200 operatively connected thereto relates to legal compliance. Laws often specify the maximum permissible amount of reprocessed material to be present in a blend of resin material to be molded in order to insure a quality level or that at least a minimum amount of reprocessed material is used to equal advertised claims of recycling. Use of gravimetric blender 11 having command and data reader 200 operatively connected thereto permits bar code or other reading of a part number, insuring that the proper recipe is entered into microprocessor 34 controlling operation of gravimetric blender 11 and further insures that proper percentages of materials are used as gravimetric blender 11 provides the required recipe to the molding machine.

Blender 11 preferably operates by blending components by weight based on settings which are preferably established by microprocessor controller 34, e.g. in response to bar code or other encoded information. Blending is desirably done in batches of 2,000, 4,000, 9,000 or 18,000 grams, depending on the amount desired. Each component is preferably dispensed separately and sequentially into weigh bin 15 and then all components are dropped together into mixing chamber 20.

Blender 11 is preferably positionable directly over the feed throat of a process machine used to mold or extrude plastic material, with blender 11 being bolted or otherwise fixedly connected to the process machine.

When exclusively solid materials are to be blended to form a desired composition, constituent components of the composition can be selected on the basis of material available. Typically, regrind material is dispensed first according to the percent of regrind material required. If no regrind material or a limited amount of regrind material is present, then portions of natural material, solid color material and additive material are increased to bring about a full batch weight. Natural material is typically added second.

Microprocessor 34 is preferably configured to compute appropriate proportions of required and natural material to form a desired volume of blended product. The amount of natural material added is preferably calculated by microprocessor 34 to leave exactly the right amount of room in the mix chamber for the solid color material and other additive material, if any. Once the natural material fill portion of the cycle has been completed, the exact weight of the natural material that has been dispensed is determined to detect any errors. Based on this actual weight of natural material dispensed, color additive, in the form of solid color additive material, is metered into the weigh bin and then other solid additive materials are metered into the weigh bin in the same manner. All of these components are then dumped together from the weigh bin into the mixing chamber, which is preferably running continuously.

When liquid color material is used in place of solid color material, the liquid color material is preferably added to the weigh bin last.

Microprocessor control means 34 provides the serially metered components and the optional preselected weight of liquid color material unitarily to a mixing station defined by mix chamber 20 by opening weigh bin 15 thereby to permit the materials vertically supported thereby to fall downwardly into the mix chamber. Weigh bin 15 is preferably opened by a pneumatic piston-cylinder combination controlled by microprocessor 34. The pneumatic piston-cylinder combination is mounted on frame 14 and is connected to weigh bin 15 so that weigh bin 15 opens responsively to movement of the piston member of the piston-cylinder combination.

In mix chamber 20 the solid material components which have been preferably unitarily supplied and serially metered to weigh bin 15, and optionally a pre-selected weight of liquid color material, are mixed into a blend preparatory to being supplied to a manufacturing processing machine (not shown) such as a molding press or an extrusion machine.

When the optional liquid color is introduced to the material to be blended in weigh bin 15 and has been dropped into mix chamber 20, the mixer portion, specifically mixing agitator 22 of gravimetric blender 11, effectively pre-coats the material pellets which have come from hopper 12 through weigh bin 15 into mix chamber 20 with the liquid color. This produces superior color dispersion in final production parts produced by injection or compression molding or by extrusion, providing a substantial improvement over results achieved when liquid color material is blended with plastic resin by metering liquid color directly into the throats of plastic material processing machines such as extruders and molding presses. Supplying liquid color 122 to weigh bin 15 of gravimetric blender 11 using pump 124 permits accurate computerized tracking of liquid color material used.

Liquid color 122 by its very nature presents a continuous potential for substantial clean-up difficulties in the event of a spill, malfunction of equipment or breakage of any of the feed lines such as pump color feed line 126 or mixer color feed line 128. Providing liquid color 122 directly into weigh bin 15 of gravimetric blender 11 provides a practical means of handling liquid color 122 and minimizes clean-up problems in the event of equipment failure.

Desirably, monitoring of weight of material at the weighing station is performed continuously by the microprocessor continuously digitally sensing signals supplied by load cells which are depicted schematically in FIG. 1 and identified generally 32 therein. Load cells 32 are interposed between weigh bin 15 and frame 14. Weigh bin 15 is suspended by and from load cells 32 with respect to frame 14. Depending on the size of weigh bin 15, a single load cell or multiple load cells may be used.

Most desirably, metering of liquid color to the weighing station defined by weigh bin 15 is performed by providing pump 124 as a peristaltic pump of a known type having a control connection with the microprocessor for controlling the flow of liquid to the weigh station, and further having a monitoring connection with the microprocessor to provide a monitoring signal indicative of the amount of fluid dispensed peristaltically.

Microprocessor 34 is connected to selectively actuate solenoid-controlled preferably pneumatic valves, which are not illustrated in FIG. 1, to provide pneumatic pressure via suitable conduits to piston-cylinder slide gate combinations 18. These solenoid valves, which are preferably selectively actuated by a control connection with microprocessor 34, are each preferably individually connected via two suitable conduits, which are preferably flexible plastic tubing, to the associated individual piston-cylinder slide gate combinations 18 in order to open and close individual slide gates 19 by application of pneumatic pressure to an appropriate side of a piston 21 portion of a piston-cylinder combination 17.

Each solenoid valve, specifically the core of the solenoid, is spring-biased towards a position corresponding to that at which the piston member 21 of a piston-cylinder slide gate combination 18 associated with a given solenoid valve is at a preferred position, referred to as the default position, for operation of gravimetric blender 11. When there is a change in operational factors, such as removal of a blended batch from mix chamber 20, a need for additional material in weigh bin 32, commencement of a loading cycle and the like, microprocessor 34 is programmed to identify such operational factors and to actuate one or more appropriate pistons of the piston-cylinder slide gate combinations 18. For example, microprocessor 34 is programmed to open one of the compartments within hopper 12 to add an amount of component material from that compartment to weigh bin 15 during the component mixing step of batch formation. In such case microprocessor 34 actuates the solenoid valve associated with the given piston-cylinder slide gate combination of interest, thereby moving the piston member of the appropriate piston-cylinder slide gate combination 18 from the default position to a position at which a given hopper slide gate is open or other desired action has been taken.

Each solenoid valve includes a valve member and a solenoid actuator. Suitable operative wiring connections are made from the solenoid actuators to microprocessor 34.

Each solenoid actuator includes a core member which when actuated due to voltage being applied to an associated coil, moves axially respecting the coil and actuates an associated valve member against the bias of a spring which continuously urges the core towards the default position.

The solenoid actuated valves function to move pistons within air cylinders by pressurizing one side of a piston and opening the other side to the atmosphere. There is no vacuum involved, just pressure above atmospheric pressure and ambient atmospheric pressure.

The solenoid valves are preferably four-way solenoid valves, meaning that each valve has four ports. These are a pressure port, an exhaust port and two function ports which are connected to the given air cylinder of interest by flexible plastic tubing. The pressure and exhaust ports are connected to air pressure and ambient atmosphere respectively by way of a manifold which provides common pressure and exhaust ports for all of the solenoid actuated valves.

The valve in its normally at rest or default state connects pressurized air to an "A" port and ambient air to a "B" port. When the valve is energized the "A" port is switched to ambient air and the "B" port is switched to the pressurized air. Two air lines 25 preferably connect each solenoid actuated valve to a given air cylinder with one solenoid actuated valve being provided for and connected to each air cylinder. At rest or default, a piston 21 within a given air cylinder 17 is preferably extended so that the slide gate actuated by piston 21 is closed. When the associated solenoid valve is energized, piston 21 retracts, the associated slide gate 19 opens and material in the hopper is dispensed downwardly.

Solenoid actuated valves may also be used to empty the contents of the weigh bin into the mixing chamber, and further may be used to operate an optional flow control valve serving as the shutoff at an exit opening at the bottom of the blender. If the blender is fitted with such a flow control at the bottom, the flow control valve may hold material in the chamber for a time period for better mixing prior to delivering the mixed material to further processing equipment, such as a molding machine.

Each solenoid valve preferably has associated therewith a pair of pneumatic conduits, each of which is connected to a manifold. One of the pneumatic conduits preferably leads to a pressurized air inlet portion of the manifold where the air inlet or a pressurized portion of the manifold may be in the form of a conduit extending longitudinally through the manifold. Similarly, a second one of the pneumatic conduits associated with a given solenoid valve may be an unpressurized, ambient air conduit and may communicate with an exhaust portion of the manifold where the exhaust portion similarly may be a conduit extending longitudinally through the manifold.

Each solenoid valve operates to connect either positive air pressure, as received by a pneumatic conduit communicating with a pressurized air inlet, or ambient pressure as present in a pneumatic conduit communicating with the exhaust or ambient portion of the manifold, to default and signal conduits respectively. Apertures formed in the manifold define open ends of the respective pressurized and ambient conduits.

The solenoid valves and especially the actuators of the solenoid valves are preferably maintained within an enclosed housing. The housing is preferably of sheet metal construction and can be constructed from multiple pieces secured together by nut and bolt combinations, by sheet metal screws or by other means. The housing preferably fits around the solenoid actuators and specifically preferably encloses face surfaces of the solenoid actuators in which or from which the movable core of the solenoid portion of the solenoid valve may be accessed.

Preferably the manifold, the solenoid valves, the closed housing and the associated structure are mounted on the bottom side of a housing for microprocessor 34, which is preferably provided in cantilevered fashion extending from upstanding members 30 of frame 14, as illustrated in FIG. 1. The manifold, the associated solenoid valves, the closed housing and the structure enclosed therewithin may be secured to the bottom of the housing for microprocessor 34 which via suitable bolt and nut combinations, as illustrated in FIGS. 1.

The gravimetric blender illustrated in FIG. 1 has two load cells 32. Larger capacity gravimetric blenders are provided with two load cells whereas smaller capacity gravimetric blenders utilize only a single load cell, for economy purposes.

Suitable load cells are available from Tedea Huntleigh, an Israeli company. Model 1010 load cells available from Tedea Huntleigh are particularly suitable.

Suitable solenoid actuated valves are available in the United States under the trademark MAC; the model 45A-L00-DDAA-1BA9 is particularly suitable.

During normal operation of blender 11 regrind material, if being used, is dispensed first into weigh bin 15. After the dispensing of the regrind material, microprocessor 34 calculates space remaining in weigh bin 15. Natural or virgin material is normally dispensed secondly with the amount of material being dispensed calculated by microprocessor 34 to be sufficient to fill weigh bin 15, leaving just enough space in weigh bin 15 for color and additive components. Once natural or virgin material dispensing has been completed, the exact weight of the virgin or natural material dispensed is calculated by microprocessor 34 and, based on this actual dispensed weight, the amount of color and additive dispenses are calculated by microprocessor 34.

The color and additive dispense components are then sequentially dispensed, one at a time, by microprocessor 34 as requested and required. The color and additive dispenses are calculated as a percentage of the virgin material dispensed only, not of the regrind material.

If the virgin, color or additive components dispensed fail to reach the required and requested weight of material in weigh bin 15, microprocessor 34 senses the output of load cell(s and holds the dispensing operation. Microprocessor 34 then actuates an alarm, setting off a strobe light and operation of the gravimetric blender is suspended by microprocessor 34 until the problem is corrected.

Each amount of component dispensed is checked and recorded by microprocessor 34. The dispense rate of each component is recalculated for each dispensing cycle to insure continuous dispensing and mixing process accuracy.

Once the completed batch has been dispensed into the weigh bin 15, microprocessor 34 actuates dumping of weigh bin 15 to dump the contents thereof into mixing chamber 20 in which the components are thoroughly blended together before being provided to the throat of a plastic processing machine.

Microprocessor 34 also supplies to a visible display the total weight of material, in grams, in weigh bin 15 at any time. During a dispensing cycle, the displayed weight is not changed.

Dispensing cycles are triggered when a high level sensor in mixing chamber 20 is uncovered as a result of material being dispensed from the mixing chamber. The sensor must be uncovered for at least two seconds before cycle is initiated by microprocessor 34. Once a dispense cycle is started by microprocessor 34, covering the high level sensor in mixing chamber 20 does not stop the cycle. Operation of the cycle by microprocessor 34 continues until the cycle is complete.

Figure 2:
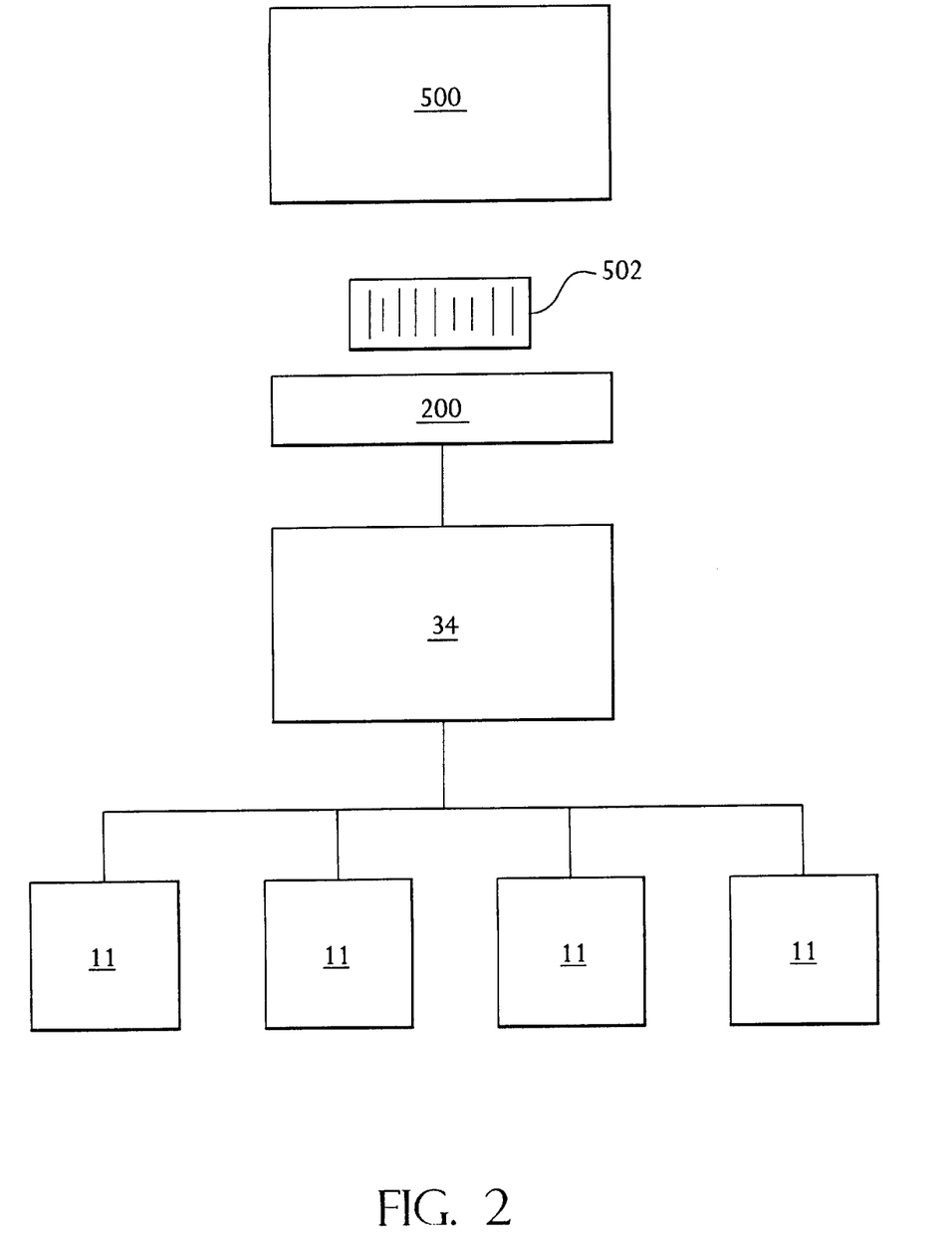
FIG. 2 is a schematic block diagram illustrating control of multiple gravimetric blenders by a single microprocessor with single microprocessor being provided data on tangible media from a remote location with the tangible media being transported from the remote location to the microprocessor.

FIG. 2 depicts schematically operation of microprocessor 34 controlling a plurality of gravimetric blenders 11 which have been depicted schematically. Microprocessor 34 receives commands from command and data reader 200, also depicted schematically in FIG. 2.

A command generator depicted schematically and designated generally 500 is provided for generating one or more commands for desired operation of granular material weight blending apparatus at a remote site. The command or commands created by generator 500 are encoded into transportable time-stable machine readable tangible storage media which is depicted schematically and designated generally 502 in FIG. 2. The one or more transportable time-stable machine readable tangible storage media 502 are transported to a compatible command and data reader 200 which is operatively connected to granular material processing apparatus, namely the plurality of gravimetric blenders 11 via microprocessor 34. Command and data reader 200 scans tangible media 502 having the command(s) encoded thereon to read the command(s) and provides the read command(s) as input to microprocessor 34 which is operatively connected to gravimetric blenders 11 for regulation of operation thereof.

The transportable time-stable machine readable tangible storage media 502 may be optically readable strips, digitally encodable chips, labels having bar codes encoded thereon, magnetically readable strips and the like.

The command generator 500 may generate commands having equipment-specific identifiers encrypted therein for desired operation of selected equipment or components of one or more of the gravimetric blenders 11. In such case the commands are encoded into the transportable time-stable machine readable tangible storage media 502 which are then transported to the compatible command and data reader 200 for reading of the command and supplying of the command to the microprocessor 34. When the read commands are provided to microprocessor 34, the microprocessor recognizes the equipment-specific identifiers which had been encrypted into the commands and furnishes those commands to the specifically identified gravimetric blender and/or a component thereof for operation of this gravimetric blender.

Figure 3:
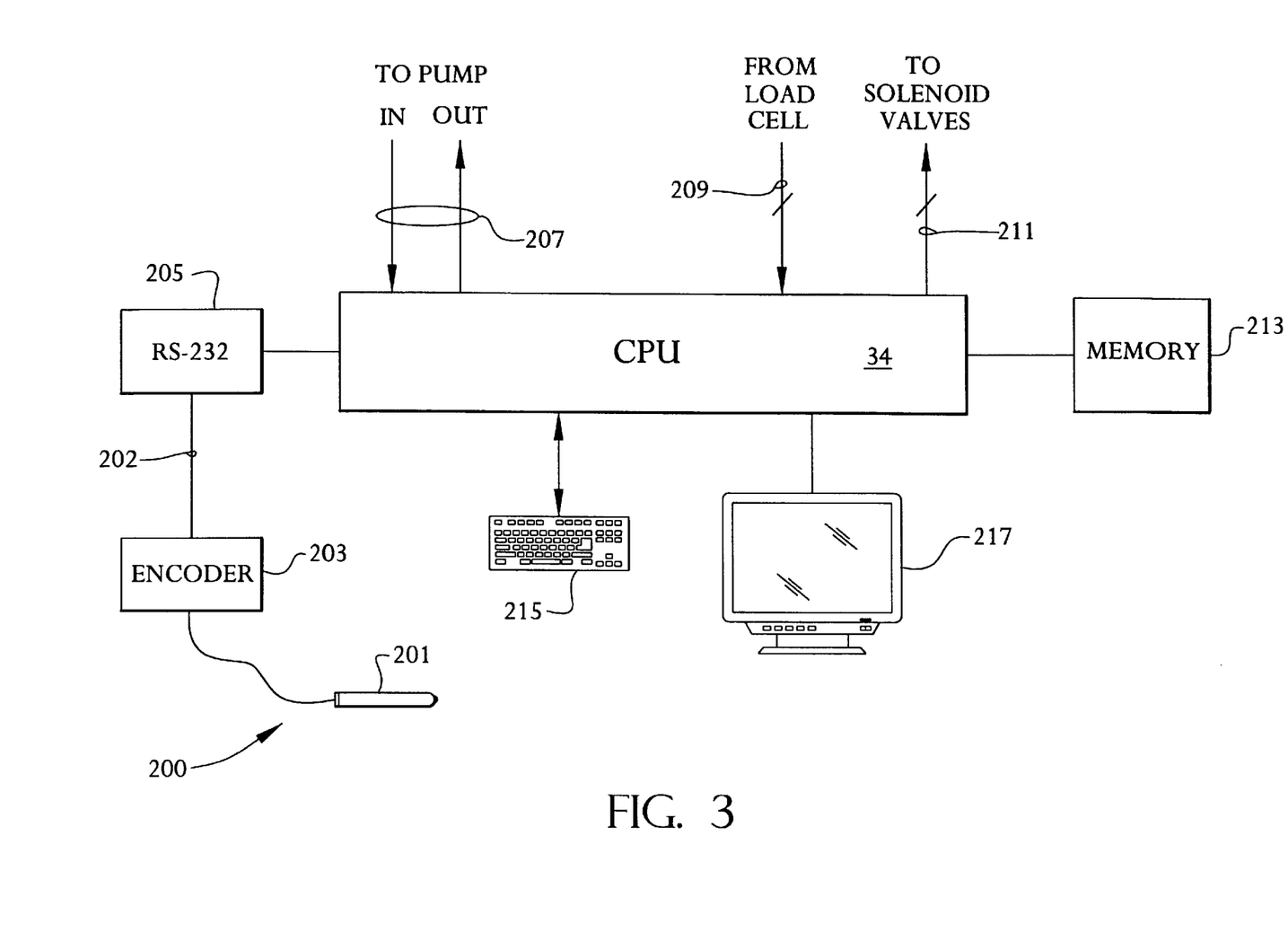
FIG. 3 is a diagram schematically depicting an electrical control system for a gravimetric blender manifesting aspects of the invention.

FIG. 3 depicts an electrical control system for the gravimetric blender. The electrical control system includes a central processing unit, such as microprocessor 34. Microprocessor 34 is connected with load cell 32 via input line 209 to provide microprocessor 34 with continuous access to a signal from load cell 32 representing the weight of the current contents of weigh bin 15. A plurality of control lines 211 conduct control signals from microprocessor 34 to the solenoid valves associated with the piston slide gates for opening and closing respective material compartments of hopper 12, and for transfer of dispensed material from weigh bin 15 into mixing chamber 20. A further input/output connection 207 is provided between microprocessor 34 and pump 24 to initiate transfer of liquid coloring agent to weigh station 15, and to monitor the quantity of liquid color agent thus transferred.

Data reader 200 comprises a transducer, such as a bar code wand 201, and an encoder 203 for converting optically sensed commands and/or data into an appropriate format for transmission to microprocessor 34. For example, microprocessor 34 may be connected with a serial digital interface, such as an RS-232 interface 205 which, in turn is connected to encoder 203 via an RS-232 serial data communication connection 202. In alternative embodiments, other varieties of record-bearing commands and/or data entry may be provided such as magnetic strip encoding of commands and/or data pertaining to ingredient containers, operator identification, and composition selection.

The invention provides compatible operation with non-volatile, or time-stable, command and/or data bearing records such as optical bar codes, imprinted or otherwise stored upon media that are applied to ingredient packages, finished product packages, and upon command and/or data bearing records to identify desired blends or recipes to be produced and for identifying operating personnel. Microprocessor 34 is preferably further connected with a user interface comprising a key pad 215 and a display 217.

In an alternative embodiment, the user interface may be remotely located from the microprocessor 34 and from the gravimetric blender system, as may be desirable in embodiments where a plurality of such gravimetric blenders are to be controlled from a central location. Key pad 215 is provided to allow a user to enter configuration information into the microprocessor and/or to select among various optional modes of operation. Display 217 is provided for prompting the user to perform various actions during operation of the gravimetric blender and/or to provide information pertaining to the status in progress of the blending procedure.

A memory 213 is preferably associatedly connected with microprocessor 34 for storing configuration and operational parameters such as the requisite proportions of ingredients to be combined for various blend compositions. For example, in order to produce a batch of a selected composition, and optionally to provide such composition directly to a molding machine, the user may enter via the keyboard or select a commands and/or data-bearing record such as a card bearing a bar code identifying the composition to be produced. Alternatively, such information may provided to microprocessor 34 from a remote location. In one example, the commands and/or data-bearing record is scanned by a data entry transducer, such as by scanning bar code wand 201 across a selected record identifying the desired composition. Identification of the selected composition is then provided to microprocessor 34 via RS-232 interface 205. The commands and/or data-bearing record may optionally specify a quantity to be produced or, alternatively, the user may be prompted via display 217 to enter the desired quantity of the selected composition. In either event, microprocessor 34 then retrieves the type and quantity of the constituent materials required to produce the select composition, from memory 213, which has been pre-programmed to contain information pertaining to the constituent materials required for various desired compositions.

Once the constituent components of the desired composition have been identified, the user may be prompted via display 217 to select the proper constituent materials and to load them into hopper 12. In order to confirm that hopper 12 is thus loaded with the correct constituent materials, the user may further be prompted to scan, via bar code wand 201, optical record-bearing labels that have been pre-applied to stores of the various constituent materials. Alternatively, constituent materials may be semiautomatically or automatically provided to the hopper by a conveyer system and/or robotic inventory of retrieval system, during which process bar code wand 201 may be positioned to automatically record the identity of materials provided to the hopper during the loading phase of operation.

After the constituent materials have been provided to the hopper, microprocessor 34 proceeds as has been described, to provide signals to signal lines 211 in order to operate the solenoid valve for sequentially providing constituent ingredients to weigh bin 15, to optionally control pump 24 via signal lines 207 to provide the selected predetermined quantity of liquid coloring agent to the mix, and then to actuate the weigh bin 15 in order to dump the correct constituent materials into mixing chamber 20. Finally, after the blend has been mixed it may be provided in bulk form for transport to a further processing station or provided directly from the mixing chamber into a material access entry of further processing machine, such as a molding machine.

We claim the following:

1. A method for weight blending of granular materials comprising:
   a. at a remote site generating a command for desired operation of granular material weight blending apparatus;
   b. encoding said command into transportable time-stable machine readable tangible storage media;
   c. transporting said media to a bar code reader operatively connected to said granular material weight blending apparatus;
   d. scanning the tangible media having the command encoded thereon to read the command; and
   e. providing the read command as input to a microprocessor operatively connected to said granular material weight blending apparatus for regulating operation of the same.

2. A method for controlling granular material processing apparatus comprising:
   a. at a remote site generating a command for desired operation of granular material processing apparatus;
   b. encoding said command into transportable time-stable machine readable tangible storage media;
   c. transporting said media to a compatible command reader operatively connected to said granular material processing apparatus;
   d. scanning the tangible media having the command encoded thereon to read the command; and
   e. providing the read command as input to a microprocessor operatively connected to said granular material processing apparatus for regulating operation of the same.

3. The method of claim 2 wherein said commands are encoded into said storage media as optically readable bar codes.

4. The method of claim 2 wherein said storage media include magnetic strips.

5. The method of claim 2 wherein said storage media include digitally encodable chips.

6. The method of claim 2 wherein said storage media include optically readable strips.

7. The method of claim 2 wherein said commands have multiple fields.

8. A method for controlling a granular material processing system comprising:
   a. at a remote site generating commands having equipment-specific identifiers encrypted therein for desired operation of selected equipment of a granular material processing system;
   b. encoding said commands into transportable time-stable machine readable tangible storage media;
   c. transporting said media to compatible command reading means operatively connected to selected equipment of said granular material processing system;
   d. scanning the tangible media having the commands encoded therein to read the commands; and
   e. providing the read commands as input to at least one microprocessor operatively connected to selected equipment of said granular material processing system for regulating operation of said selected equipment according to microprocessor recognition of said equipment-specific identifiers encrypted into said commands.

9. Apparatus for weight blending of granular materials comprising:
   a. means for generating a command for desired granular material weight blending and encoding said command into transportable time-stable machine readable tangible storage media;
   b. means for scanning the tangible media having the command encoded thereon to read the command;
   c. microprocessor means for interpreting the read command and controlling operation of said apparatus;
   d. a material storage hopper including means operatively connected to said microprocessor and controlled thereby for dispensing material within said hopper;
   e. a bin below said hopper;
   f. means operatively connected to said microprocessor for sensing weight of material in said bin and providing same to said microprocessor for use thereby in regulating operation of said material dispensing means.

10. A gravimetric blender comprising:

a. a housing;

b. a material storage hopper mounted on said housing;

c. a bin connected to said housing below said hopper;

d. means, connected to said housing, for sensing weight of material in said bin as received from said hopper;

e. means for generating a command respecting granular material weight blending and encoding said command into transportable time-stable machine readable tangible storage media;

f. means for scanning the tangible media having the command encoded thereon to read the command;

g. microprocessor means for interpreting the read command and controlling operation of said apparatus;

h. means operatively connected to said microprocessor and controlled thereby for dispensing material within said hopper;

i. means operatively connected to said microprocessor for sensing weight of material in said bin and providing same to said microprocessor for use thereby in regulating operation of said material dispensing means;

j. a mix chamber below said bin and receiving material therefrom including mixing means therewithin;

k. drive means regulated by said microprocessor for imparting rotary motion to said mixing means.

11. The gravimetric blender of claim 10 wherein said storage media is magnetic.

12. The gravimetric blender of claim 11 wherein said storage media is optically based.

13. The gravimetric blender of claim 12 wherein said storage media has optically readable bar codes thereon.

* * * * *

UNITED STATES PATENT AND TRADEMARK OFFICE
CERTIFICATE OF CORRECTION

PATENT NO : 6,188,936
DATED : February 13, 2001
INVENTOR(S) : Stephen B. Maguire and Paul S. Maguire

It is certified that error appears in the above-identified patent and that said Letters Patent is hereby corrected as shown below:

On title page,
[73] Assignee: Maguire Products, Inc., Aston, Pennsylvania.

Signed and Sealed this

Twenty-ninth Day of May, 2001

Attest:

NICHOLAS P. GODICI

Attesting Officer

Acting Director of the United States Patent and Trademark Office